US011394928B2

(12) United States Patent
Pritchett

(10) Patent No.: US 11,394,928 B2
(45) Date of Patent: Jul. 19, 2022

(54) SECURE VIDEO DOORBELL CONTAINER WITH ANTI-THEFT DOOR HOOK

(71) Applicant: Doorbell Boa Operating LLC, Peachtree Corners, GA (US)

(72) Inventor: James Pritchett, Peachtree Corners, GA (US)

(73) Assignee: Doorbell Boa Operating LLC, Peachtree Corners, GA (US)

( * ) Notice: Subject to any disclaimer, the term of this patent is extended or adjusted under 35 U.S.C. 154(b) by 0 days.

(21) Appl. No.: 16/664,799

(22) Filed: Oct. 26, 2019

(65) Prior Publication Data

US 2021/0314532 A1   Oct. 7, 2021

(51) Int. Cl.
*H04N 7/18* (2006.01)
*F16M 13/02* (2006.01)
*G08B 7/06* (2006.01)

(52) U.S. Cl.
CPC ............ *H04N 7/183* (2013.01); *F16M 13/02* (2013.01); *G08B 7/06* (2013.01)

(58) Field of Classification Search
CPC ........... H04N 7/183; F16M 13/02; G08B 7/06
USPC .................................................. 348/138, 143
See application file for complete search history.

(56) References Cited

U.S. PATENT DOCUMENTS

| 3,270,333 | A | * | 8/1966 | La Barber | G08B 13/08 |
| | | | | | 248/302 |
| 4,817,239 | A | * | 4/1989 | Campbell | E05B 1/0053 |
| | | | | | 16/413 |
| 4,894,858 | A | | 1/1990 | Collingwood | |
| 4,909,052 | A | | 3/1990 | Hutwohl | |
| 5,309,510 | A | | 5/1994 | Berndt | |
| 5,341,123 | A | | 8/1994 | Schuman, Sr. et al. | |
| 8,398,316 | B2 | | 3/2013 | Mota et al. | |
| 8,534,627 | B2 | | 9/2013 | Kressin | |
| 9,578,261 | B1 | | 2/2017 | Rockwell et al. | |
| 2009/0096918 | A1 | | 4/2009 | Montelongo | |
| 2011/0243545 | A1 | * | 10/2011 | Mota | G03B 17/00 |
| | | | | | 396/427 |
| 2011/0292213 | A1 | | 12/2011 | Lacey | |

(Continued)

FOREIGN PATENT DOCUMENTS

WO    2021081538 A1    4/2021

OTHER PUBLICATIONS

International Search Report and Written Opinion dated Jan. 27, 2021 cited in Application No. PCT/US20/57428, 7 pgs.

(Continued)

*Primary Examiner* — Joseph G Ustaris
*Assistant Examiner* — Matthew David Kim
(74) *Attorney, Agent, or Firm* — Bekiares Eliezer LLP

(57) ABSTRACT

A device for inserting and securing a video doorbell system inside a metal container that is securely fitted along the side of a door and can only be opened when door is opened. The device comprises a metal container measured to hold specified video doorbell systems inside WITH an opening that exposes the camera and doorbell button ONLY (FIG. 1). The metal container is attached to two u-shaped thin but durable metal hooks that snap together and cling to the side of a door snugly. The device also has cylinder tubes at the ends of each hook to decrease the ability to pull the device away from the door (anti-theft). The device also avoids property damage from permanent mounting using screws.

15 Claims, 6 Drawing Sheets

(56) References Cited

U.S. PATENT DOCUMENTS

2012/0182382 A1*  7/2012  Serramalera ........... H04N 7/147
                                                  348/14.07
2013/0293368 A1   11/2013  Ottah et al.
2021/0337090 A1   10/2021  Pritchett et al.

OTHER PUBLICATIONS

Related Design U.S. Appl. No. 29/798,529, filed Jul. 8, 2021, Inventor: James Pritchett et al.
Related U.S. Appl. No. 17/371,072, filed Jul. 8, 2021, Inventors: Pritchett et al.
U.S. Non-Final Office Action dated Nov. 9, 2021 cited in U.S. Appl. No. 17/371,072, 12 pgs.

* cited by examiner

SECURE VIDEO DOORBELL CONTAINER WITH ANTI-THEFT DOOR HOOK

BACKGROUND

This invention relates to video doorbell systems.

Currently, the widely used devices are mounted to walls next to a home entry door. The base of the device is removed and is securely mounted to the wall using screws.

The current systems do not satisfy the following criteria for a device that is mounted outdoors in the elements and easily accessible to visitors and uninvited visitors: (1) able to be easily pulled away from the system with asserted pressure; and (2) able to be mounted at properties that are not owned by the owner of the video doorbell device.

With the advent of video doorbell systems and the increased use of secure Wi-Fi networks/systems, the simple device has made it easier and safer for homeowners to inspect guests, when home AND when away from home. It is therefore, an object of this invention to provide a device that allows non-homeowners (AND homeowners) the opportunity to utilize a secure video doorbell systems without damaging any home property.

SUMMARY

An object of the present invention is to provide a door hook thin enough to fit between the side of the door and the jamb, and strong enough to hold the weight of the video doorbell system when the door is open.

The door hook of the present invention is comprised of two thin U-shaped brackets, having an outside and an inside bracket that snap together via the cylinder anti-theft tubes (FIG. 5A), a thin layer of soft non-abrasive material designed to avoid scratches and avoid sliding up and down the door on the inside surface of the inside bracket, and a metal container (measured to hold specified video doorbell holders) attached to the outside bracket.

The inside bracket swings open via small hinges (FIG. 6A) only when the actual entry door is open and the device is removed from the side of the door.

Slightly acute angles between the inside bracket and outside bracket coupled with the screwable spacer (FIG. 4C) increase holding power of the door hook along the side of the door.

BRIEF DESCRIPTION OF THE DRAWINGS

The accompanying drawings, which are incorporated in and constitute a part of this disclosure, illustrate several aspects of the invention and together with the description, serve to explain the principles of the invention. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
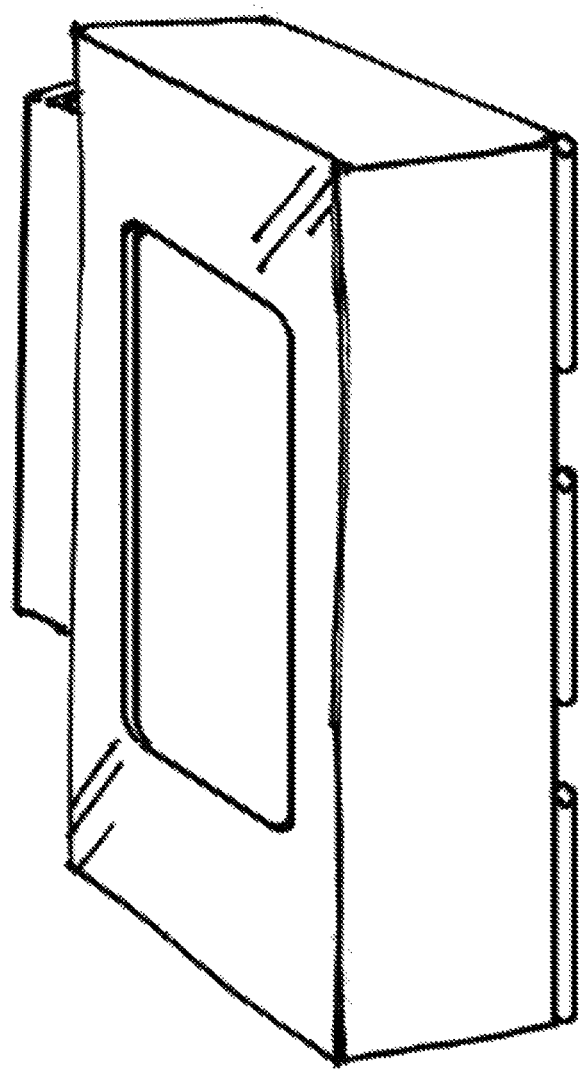
FIG. 1 is a front angled view of a video doorbell container with an opening that exposes the camera and doorbell button to guests. (Dimensions will vary based on the video doorbell model.)
Figure 2:
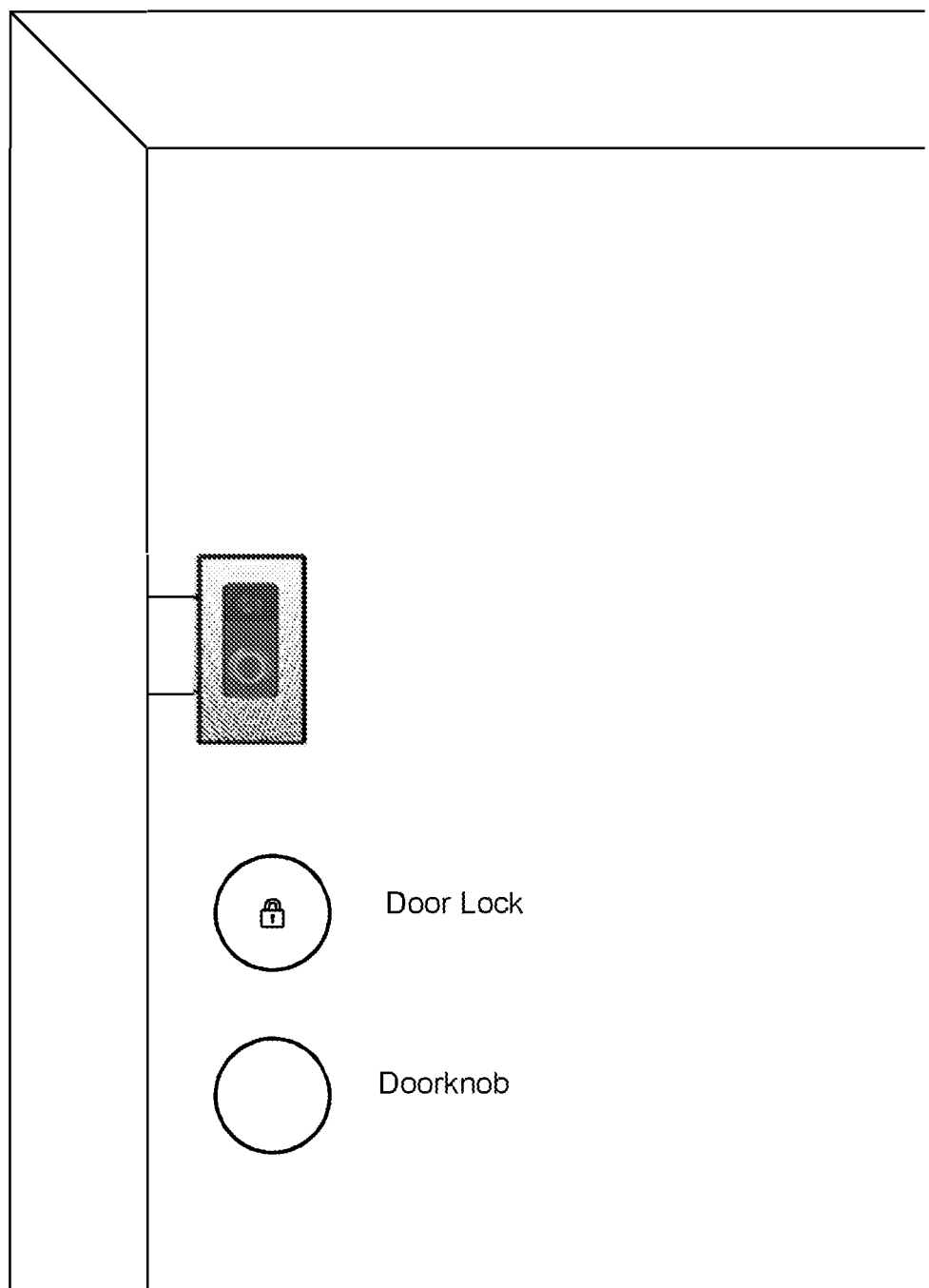
FIG. 2 is a front door exterior view of the invention secured to the door with a sample video doorbell inside. The invention's acute angled brackets, attached to the container, wrap around the side of the door from the outside to the inside and has a non-sliding and non-abrasive compressible layer of soft material glued inside.
Figure 3:
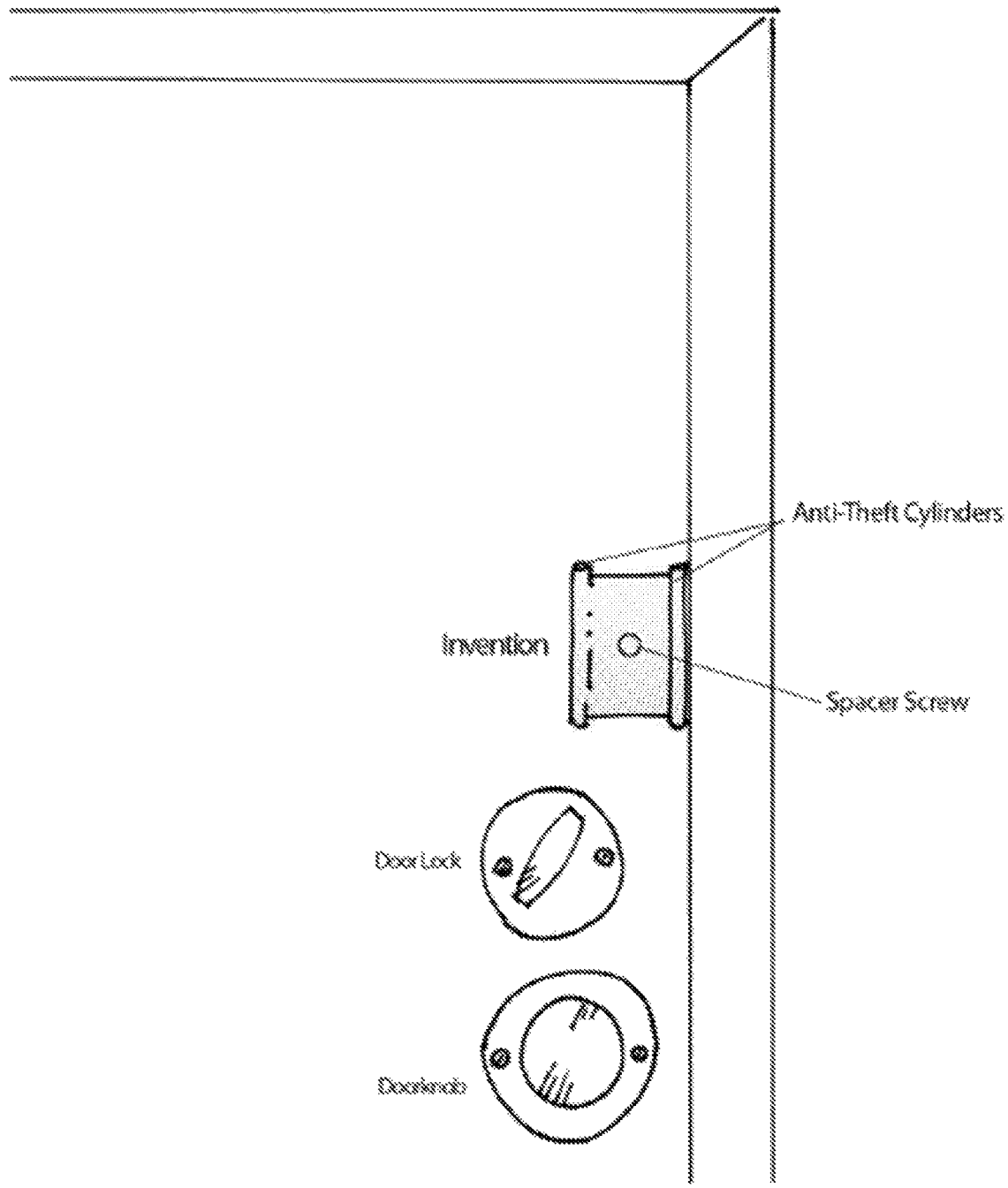
FIG. 3 is an entry door interior view of the invention secured to the door. The invention's acute angled brackets, attached to the container, wrap around the side of the door from the outside to the inside and has a non-sliding and non-abrasive compressible layer of soft material glued inside. The two brackets are a thin durable non-rust metal and are designed to fit one inside the other and still fit between the door's jamb and the door. The attached anti-theft metal cylinder masses at the end of each bracket are both larger than the closed door's very minimal opening. This helps keep the invention from being stolen or pulled away from the door. The spacer screw can be twisted to adjust to thinner doors.
Figure 4A:
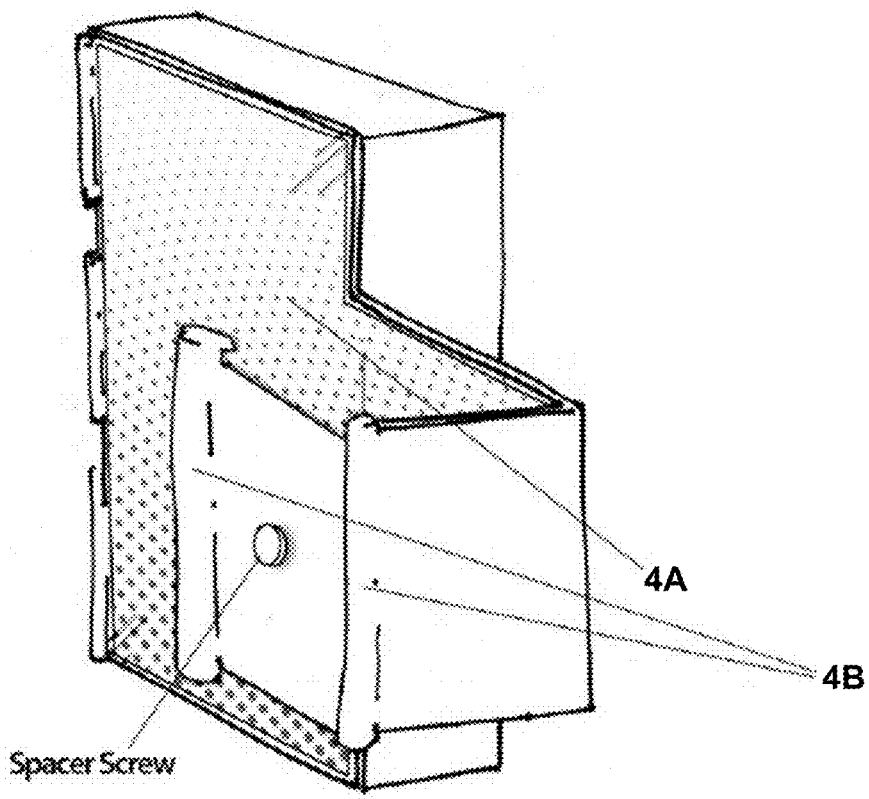
FIGS. 4A and 4B are back views of the invention. The entire invention is made of durable, non-rusting lightweight metal. The actual video doorbell device is placed inside the container and locked inside unless the door is opened. 4A refers to a thin layer of soft non-abrasive & non-sliding material. 4B refers to the container (bracket), ends of each bracket, which may have security cylinder shaped solid metal tubes that keeps the device from being pulled from outside. 4D (Part 1) refers to container (outside bracket), the container being designed specifically to house a video doorbell device (e.g., RING or ADT Video Doorbell) with a cylinder mass that ends at the edge of the inner door. 4C (Part 2) refers to container (inside bracket), the back cover is designed specifically to lock the video doorbell device (e.g., RING or ADT Video Doorbell) inside the container (which can't be opened unless the door is opened and is raised from its snapped position). The hook on Part 2 is longer and reaches further around the door with a cylinder mass to keep it secure from being pulled from the outside. Container hooks around the side of the door using thin durable metal constricts very snugly to the door using acute angles.
Figure 4B:
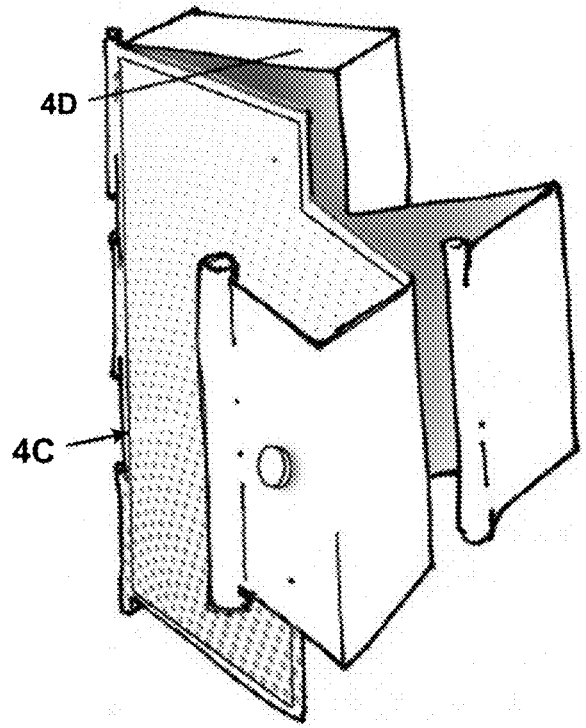
Figure 5:
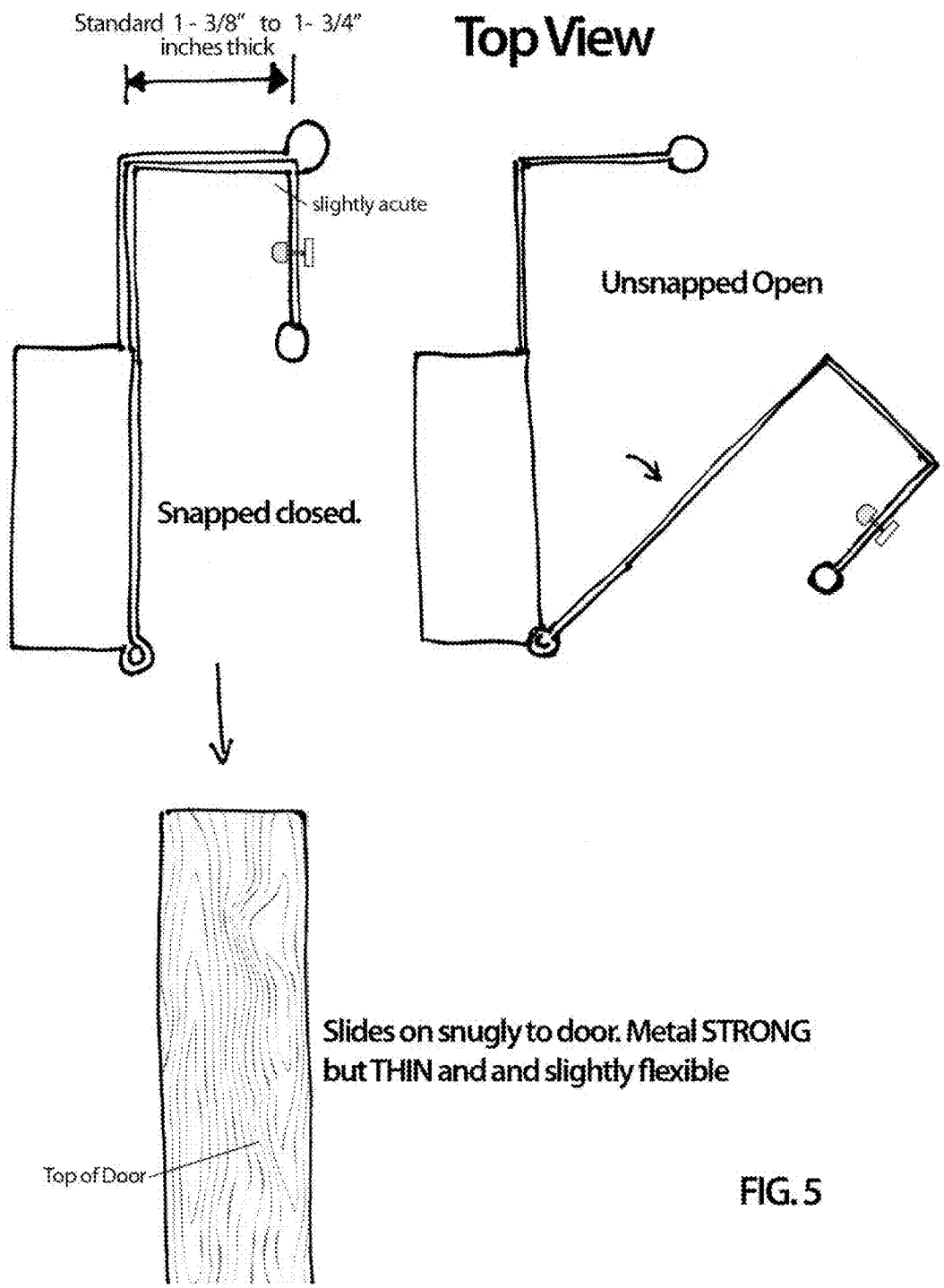
FIG. 5 is a top view of the invention which shows the process of sliding the invention onto the door. This figure also shows the invention's back (inside bracket) unsnapped and open. The container slides on snugly to door. The container's metal is strong but thin and slightly flexible.
Figure 6:
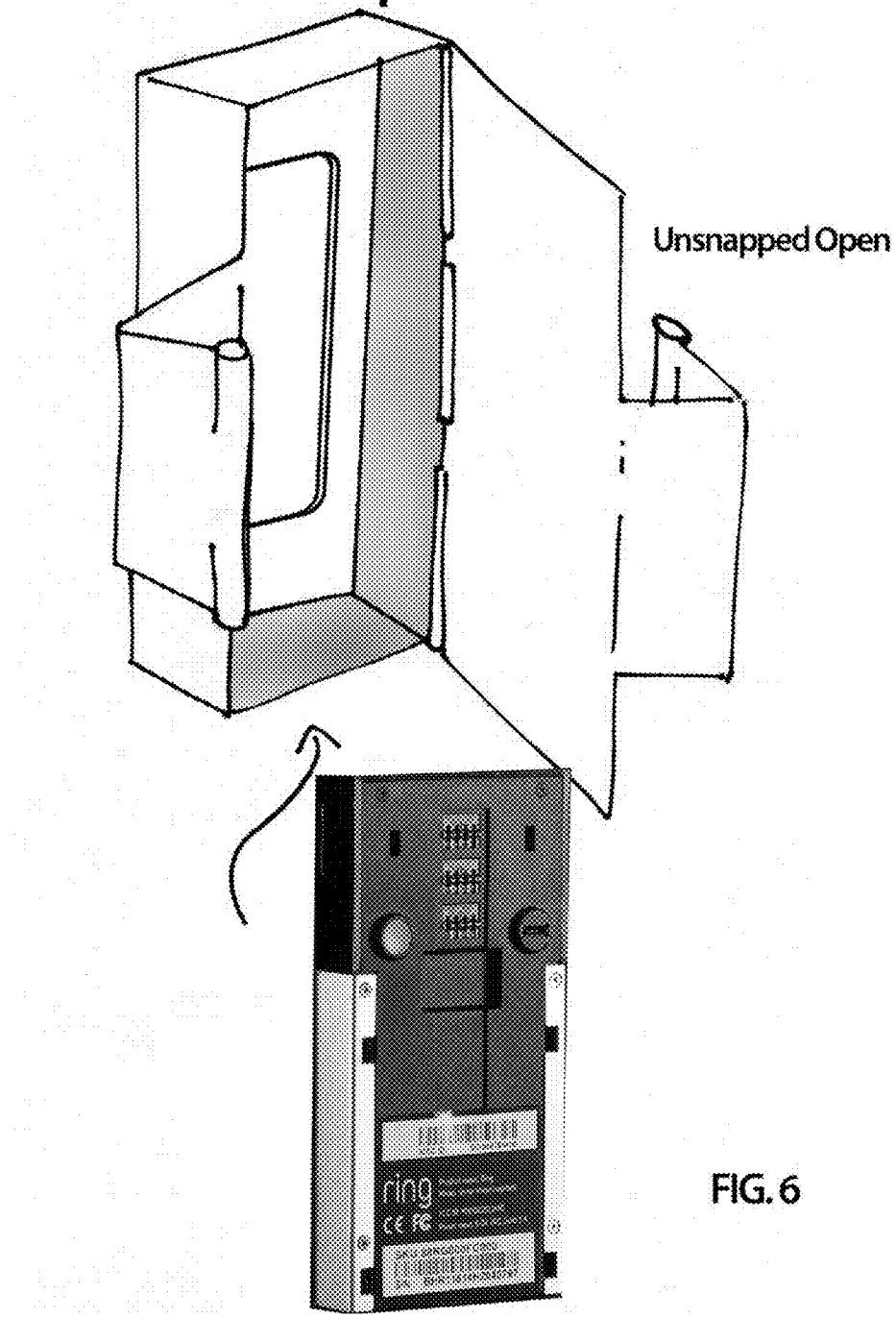
FIG. 6 is a back view of the invention with a sample RING video doorbell device displayed. The RING™ (or whichever video doorbell device is used) is placed inside the container and back is closed and snapped in place. There will be BOTH left-sided and right-sided containers with hooks available.

As shown in all the FIGURES, the invention is designed overall to keep the Consumer's video doorbell device safe from theft AND to avoid damaging property with screws. In the figures, the size of that angle has been exaggerated so that the drawings are more easily understood. The thickness of the metal will be tested to ensure a long use life.

The metal will/can be painted in various colors, based on Consumer's need.

The container may be designed with a slight angle to give the camera a full view of the guest's face since it will be only 1-2 inches away from the door's rim.

What is claimed:

1. A system for securing a video doorbell device, the system comprising:
   a housing for containing the video doorbell device; and
   a door hook mechanism comprising a first bracket portion and a second bracket portion configured to couple to the first bracket portion to secure the video doorbell device within the housing,
      wherein the door hook mechanism is configured to secure the system to a door,
      wherein each of the first bracket portion and second bracket portion comprise first and second opposed ends, and
      wherein the first bracket portion is connected to the housing at the first opposed end and comprises a cylinder locking tube at the second opposed end.

2. The system of claim 1, wherein the second bracket portion is connected to the housing at the first opposed end and comprises a cylinder locking tube at the second opposed end.

3. The system of claim 2, wherein the second bracket portion is rotatably connected to the housing.

4. The system of claim 3, wherein the second bracket portion is connected to the housing with a hinge.

5. The system of claim 2, wherein an outside surface of the second bracket portion is configured to couple with an inside surface of the first bracket portion.

6. The system of claim 5, wherein the first bracket portion and the second bracket portion are configured to couple to one another to cover an opening of the housing.

7. The system of claim 5, wherein the door hook mechanism further comprises a screwable spacer.

8. The system of claim 5, wherein the second bracket portion comprises a back cover to secure the video doorbell device inside the housing.

9. The system of claim 2, wherein the first bracket portion is connected to the housing at a first housing edge and the second bracket portion is connected to the housing at a second housing edge.

10. A system for securing a video doorbell device, the system comprising:
    a housing for containing the video doorbell device; and
    a door hook mechanism comprising an inside bracket and an outside bracket configured to couple to the inside bracket to secure the video doorbell device within the housing,
       wherein the door hook mechanism is configured to secure the system to a door,
       wherein each of the inside bracket and outside bracket comprise first and second opposed ends,
       wherein each of the inside bracket and outside bracket are connected to the housing at their respective first opposed ends and comprise a cylinder locking tube at their respective second opposed ends, and wherein the inside bracket is rotatably connected to the housing.

11. The system of claim 10, wherein an outside surface of the inside bracket is configured to couple with an inside surface of the outside bracket.

12. The system of claim 10, wherein the door hook mechanism further comprises a screwable spacer for increased holding power of the door hook mechanism.

13. The system of claim 10, wherein the inside bracket is connected to the housing with a hinge.

14. The system of claim 10, wherein the inside bracket comprises a back cover to secure the video doorbell device inside the housing.

15. The system of claim 14, wherein the inside bracket is connected to the housing at a first housing edge and the outside bracket is connected to the housing at a second housing edge.

* * * * *